(12) United States Patent
Camp, III

(10) Patent No.: US 9,784,433 B2
(45) Date of Patent: Oct. 10, 2017

(54) OPTICAL DEVICES FOR LIGHT MIXING

(71) Applicant: THE BOEING COMPANY, Chicago, IL (US)

(72) Inventor: Randolph C. Camp, III, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/501,449

(22) Filed: Sep. 30, 2014

(65) Prior Publication Data
US 2016/0091150 A1    Mar. 31, 2016

(51) Int. Cl.
| | |
|---|---|
| *F21K 99/00* | (2016.01) |
| *F21V 7/00* | (2006.01) |
| *F21V 13/04* | (2006.01) |
| *F21V 8/00* | (2006.01) |
| *G02B 27/09* | (2006.01) |
| *G02B 19/00* | (2006.01) |
| *B60Q 3/64* | (2017.01) |
| *B60Q 3/43* | (2017.01) |
| *F21K 9/60* | (2016.01) |
| *F21Y 103/10* | (2016.01) |
| *F21Y 115/10* | (2016.01) |
| *F21Y 113/17* | (2016.01) |

(52) U.S. Cl.
CPC .............. *F21V 7/0091* (2013.01); *B60Q 3/43* (2017.02); *B60Q 3/64* (2017.02); *F21V 13/04* (2013.01); *G02B 6/0008* (2013.01); *G02B 19/0028* (2013.01); *G02B 19/0066* (2013.01); *G02B 27/0994* (2013.01); *F21K 9/60* (2016.08); *F21V 7/005* (2013.01); *F21V 7/0008* (2013.01); *F21Y 2103/10* (2016.08); *F21Y 2113/17* (2016.08); *F21Y 2115/10* (2016.08)

(58) Field of Classification Search
CPC ........ F21K 9/54; F21V 7/0008; F21V 7/0091; G02B 6/001
See application file for complete search history.

(56) References Cited

U.S. PATENT DOCUMENTS

| | | | |
|---|---|---|---|
| 7,494,255 B2 | 2/2009 | Bryan et al. | |
| 2005/0225988 A1* | 10/2005 | Chaves | G02B 3/06 362/332 |
| 2005/0265044 A1* | 12/2005 | Chen | G02B 6/0028 362/558 |

(Continued)

OTHER PUBLICATIONS

LED Magazine, "Reflectors and lenses vie for usage in SSL systems," Nov./Dec. 2013 issue, 9 pages, accessed at http://www.ledsmagazine.com/articles/print/volume-10/issue-12/features/reflectors-and-lenses-vie-for-usage-in-ssl-systems-magazine.html.

(Continued)

*Primary Examiner* — Anh Mai
*Assistant Examiner* — Zachary J Snyder
(74) *Attorney, Agent, or Firm* — Patterson + Sheridan, LLP

(57) ABSTRACT

An optical device includes a lower surface that is substantially transparent. The optical device further includes an upper surface disposed opposite the lower surface and having a first specular layer disposed thereon. The optical device further includes a first lateral surface extending between the lower surface and the upper surface and having a second specular layer disposed on at least a portion thereof.

19 Claims, 8 Drawing Sheets

(56) References Cited

U.S. PATENT DOCUMENTS

| | | | | |
|---|---|---|---|---|
| 2006/0193137 | A1* | 8/2006 | Chinniah | F21K 9/68 362/326 |
| 2008/0310158 | A1* | 12/2008 | Harbers | F21K 9/54 362/240 |
| 2009/0067194 | A1* | 3/2009 | Sanchez | G02B 6/0065 362/618 |
| 2009/0310366 | A1* | 12/2009 | Huang | F21V 5/04 362/298 |
| 2010/0295442 | A1* | 11/2010 | Harbers | F21K 9/54 313/501 |
| 2011/0267835 | A1 | 11/2011 | Boonekamp et al. | |
| 2011/0267836 | A1* | 11/2011 | Boonekamp | F21K 9/52 362/555 |
| 2011/0273862 | A1* | 11/2011 | Li | G02B 6/0008 362/19 |
| 2011/0273900 | A1* | 11/2011 | Li | G02B 19/0019 362/555 |
| 2011/0286200 | A1* | 11/2011 | Iimura | F21K 9/135 362/84 |
| 2012/0147624 | A1 | 6/2012 | Li et al. | |
| 2012/0268966 | A1* | 10/2012 | McCollum | F21S 8/06 362/607 |
| 2013/0039090 | A1* | 2/2013 | Dau | F21S 8/04 362/551 |
| 2013/0128549 | A1* | 5/2013 | Weber | G02B 5/305 362/97.1 |
| 2013/0148350 | A1* | 6/2013 | Yriberri | F21V 5/04 362/235 |
| 2013/0258699 | A1* | 10/2013 | Weaver | F21K 9/52 362/555 |
| 2014/0240981 | A1* | 8/2014 | Weber | F21K 9/54 362/235 |

OTHER PUBLICATIONS

Sun et al., "Collimating lamp with well color mixing of red/green/blue LEDs," Optics Express, vol. 20, No. S1, 10 pages, Jan. 2, 2012.

European Search Report for EP15184829, Feb. 16, 2016.

* cited by examiner

OPTICAL DEVICES FOR LIGHT MIXING

FIELD

The present disclosure generally relates to lighting systems, and more specifically, to optical devices for light mixing.

BACKGROUND

Recent advances in light-emitting diode (LED) technology, including improvements in color accuracy, device longevity, energy efficiency, and manufacturing costs, have made LEDs a popular choice for many lighting applications. In particular, LED technology is commonly used in lighting applications where energy efficiency, size, and/or color accuracy are important. For example, in mobile applications, such as automotive and aeronautical applications, size and energy efficiency are important factors that are taken into account when choosing a lighting system.

Lighting systems that utilize LED technology typically use color mixing techniques to generate white light. For example, an LED lighting system may include red, green, and blue (RGB) LEDs, the output of which is mixed to generate light that is substantially white in appearance. In conventional lighting systems, RGB light is mixed to generate white light by projecting the light emitted by each of the RGB LEDs onto a surface that is a minimum distance away (e.g., 1 to 3 feet) away from the LED lighting module. When the surface onto which the light is projected is at least the minimum distance away from the LED lighting module, uniform white light may be achieved. However, when the light is projected onto a surface that is closer than this minimum distance, color mixing may be incomplete or non-uniform, resulting in color fringing and/or scalloping of the incident light. Such non-uniformities commonly prevent LED lighting modules from being separated from a target surface by a minimum distance required for light mixing.

Therefore, improved light mixing techniques would be useful for a variety of lighting applications and related devices.

SUMMARY

According to one aspect of the present disclosure, an optical device includes a lower surface that is substantially transparent and an upper surface disposed opposite the lower surface and having a first specular layer disposed thereon. The optical device further includes a first lateral surface extending between the lower surface and the upper surface and having a second specular layer disposed on at least a portion thereof.

According to another aspect of the present disclosure, a lighting apparatus includes an optical device and a reflector. The optical device includes a lower surface that is substantially transparent and an upper surface disposed opposite the lower surface and having a first specular layer disposed thereon. The optical device further includes a first lateral surface extending between the lower surface and the upper surface. The reflector is disposed proximate to the first lateral surface of the optical device.

According to yet another aspect of the present disclosure, a method of mixing light includes passing light through a lower surface of an optical device towards an upper surface of the optical device that is disposed opposite the lower surface and reflecting the light via a first specular layer disposed on the upper surface. The method further includes reflecting the light via a second specular layer disposed on a portion of a first lateral surface of the optical device that extends between the lower surface and the upper surface to generate mixed light and passing the mixed light through the first lateral surface.

DETAILED DESCRIPTION

Figure 1B:
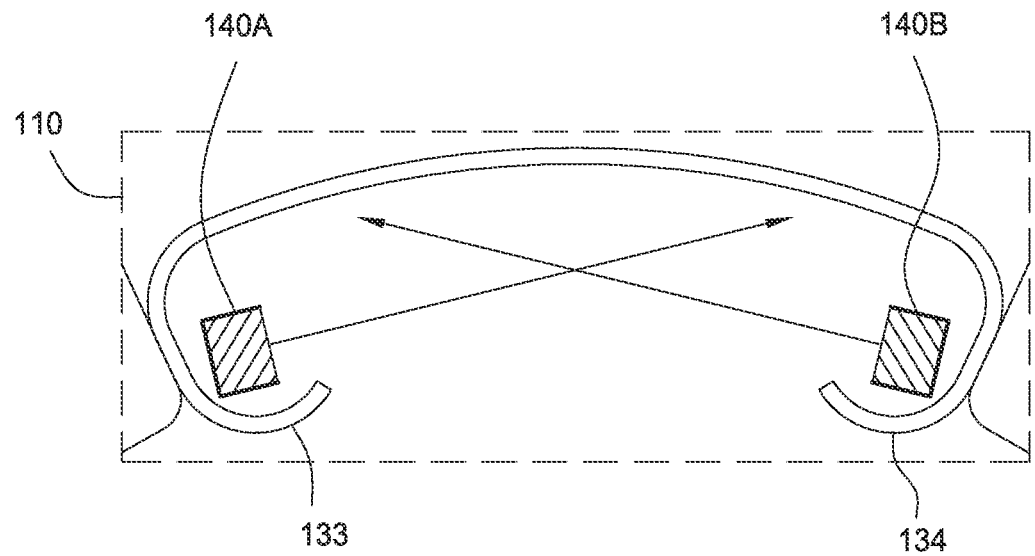
FIGS. 1A and 1B illustrate a schematic cross-sectional view of a passenger cabin of a commercial airliner in accordance with aspects of the disclosure.
Figure 1A:
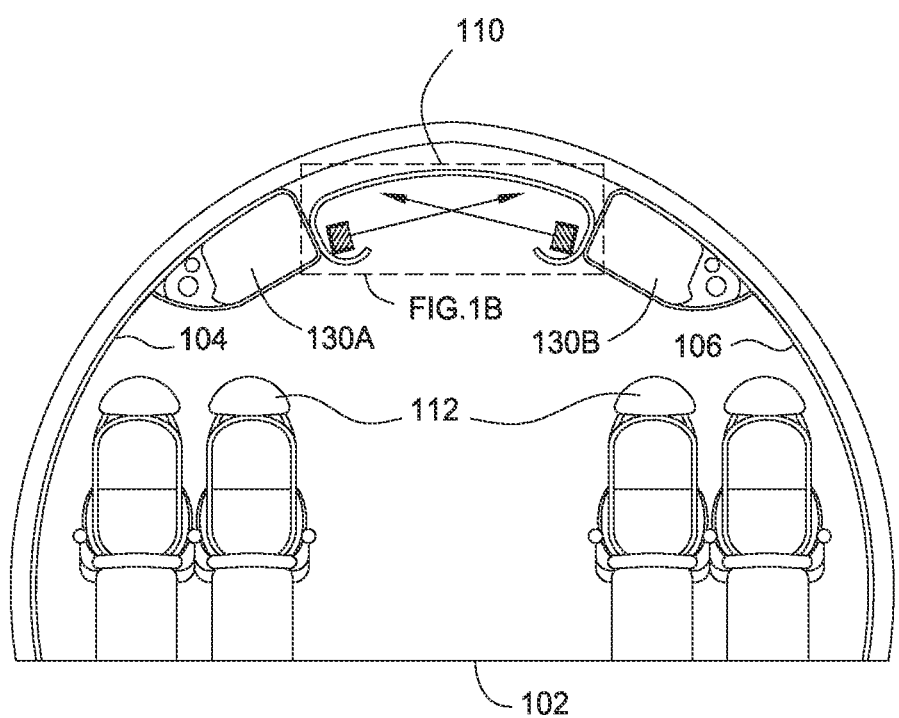

FIGS. 1A and 1B illustrate a schematic cross-sectional view of a passenger cabin of a commercial airliner in accordance with aspects of the disclosure. The passenger cabin 100 includes a floor panel 102, a pair of sidewall members or panels 104 and 106, a ceiling structure 110, and a plurality of passenger seats 112. The passenger cabin 100 may further include a plurality of outboard storage/stowage bins 130A and 130B. The bins 130A, 130B are positioned near the intersection of the sidewall members 104, 106 and the ceiling structure 110.

The ceiling structure 110 of a single-aisle aircraft generally has a curved, arch-type shape, as shown in FIGS. 1A and 1B. The curved configuration starts at the intersections with the wall members 133, 134, which are positioned immediately adjacent the outboard storage bins 130A and 130B. The ceiling structure 110 includes a pair of LED lighting modules 140A, 140B on either side of the ceiling structure 110. The LED lighting modules 140A, 140B illuminate the inner surface of the ceiling structure 110. In other aircraft configurations, additional LED lighting modules may be utilized to illuminate the surfaces of the stowage/storage bins 130B and 130A as well.

In the passenger cabin configuration shown in FIGS. 1A and 1B, each LED lighting module 140A, 140B is spaced from the portion of the ceiling structure 110 that is to be illuminated by the LED lighting module 140A, 140B by a distance of approximately 6 to 12 inches. This distance allows light outputted by each LED (e.g., a red LED, a green LED, and a blue LED) included in the LED lighting modules 140A, 140B to mix to generate light that is substantially white in appearance prior to striking a surface in the light's path. Accordingly, various types of LED lighting modules, including the LED assembly 210 described below, may be used to project substantially uniform white light onto the ceiling structure 110 in this passenger cabin configuration.

LED technology is continuously adapted for new applications. However, many of these applications do not permit a sufficient distance of separation between an LED lighting module and the one or more surfaces onto which light from the LED lighting module is to be projected. In applications where a sufficient distance of separation is not maintained, light projected by a conventional LED lighting module may exhibit color fringing and/or scalloping due to incomplete color mixing, as described below in conjunction with FIG. 1C.

Figure 1C:
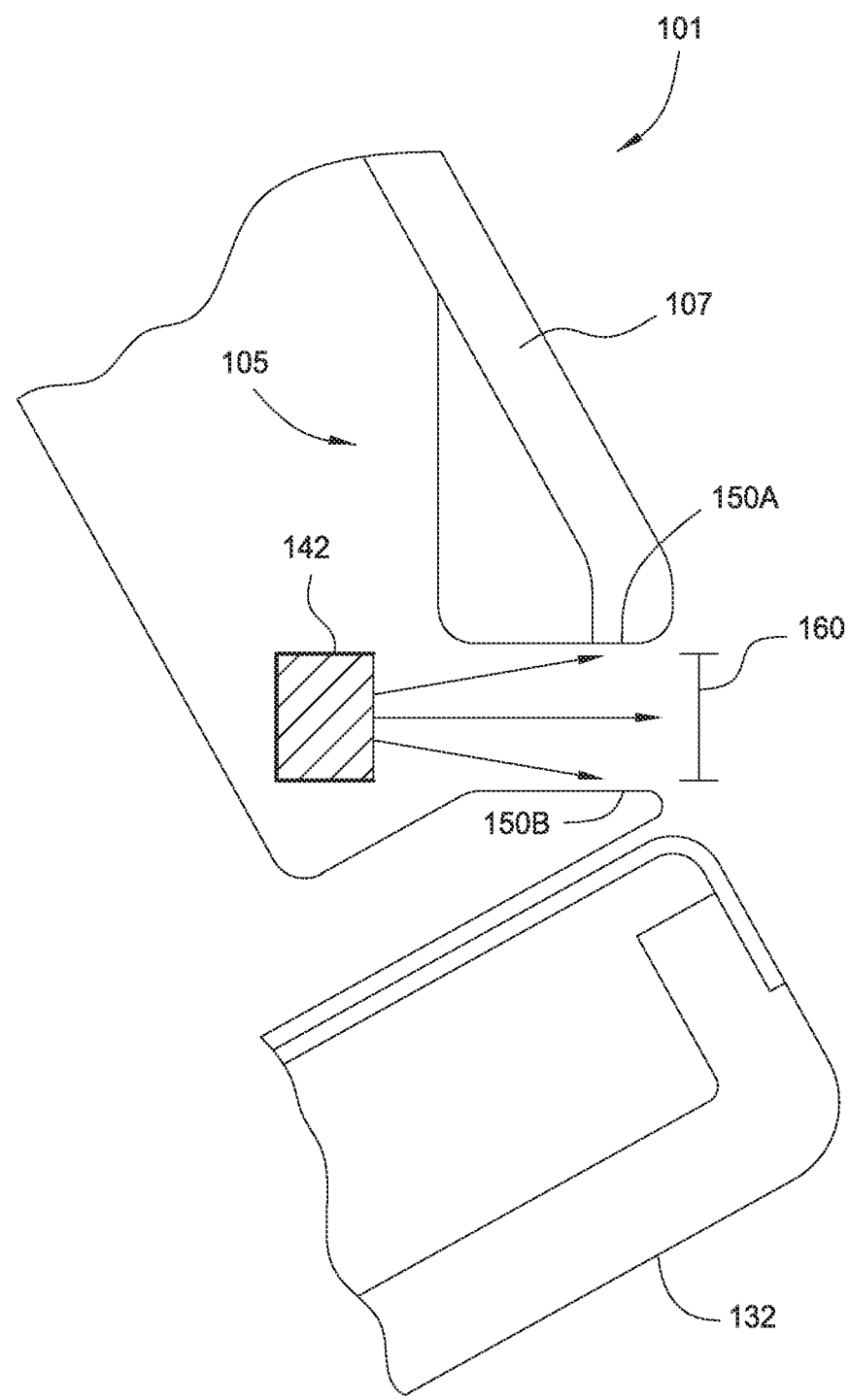
FIG. 1C illustrates a lighting module disposed within the interior architecture of a passenger cabin of a commercial airliner in accordance with aspects of the disclosure.

FIG. 1C illustrates an LED lighting module 142 disposed within the interior architecture 105 of a passenger cabin 101 of a commercial airliner in accordance with aspects of the disclosure. As shown, the passenger cabin 101 includes a storage bin 132 and a one or more panel structures 107 located above and/or below the storage bin 132. The panel structure 107 includes interior architecture 105, in which an LED lighting module 142 may be disposed. Surfaces 150A, 150B, which form an opening 160 (e.g., approximately 0.5 inches wide) between the interior architecture 105 and the passenger cabin 101, are located approximately 1 to 2 inches from the LED lighting module 142. Due to the close proximity of the LED lighting module 142 to the surfaces 150A, 150B onto which light is to be projected, if the LED lighting module 142 used conventional optics, then the light emitted from the conventional optics may be insufficiently mixed upon striking the surfaces 150A, 150B. Consequently, the surfaces 150A, 150B may exhibit color fringing and/or scalloping, as described above. Such lighting non-uniformities may detract from the appearance and/or interfere with certain aspects of the ambient lighting are intended to create. Moreover, similar non-uniformities may occur when LED lighting modules having conventional optics are used in other applications, such as in automotive applications, personal mobile devices, ambient lighting, and the like.

Accordingly, the present disclosure describes various light mixing techniques useful to ensure that light generated by an LED lighting module is mixed to produce substantially white light before or shortly after the light exits the LED lighting module. Such mixing techniques are useful in obtaining superior light mixing and/or color uniformity when an LED lighting module is positioned close (e.g., less than about 6 inches) to the surface(s) onto which light is projected, as well as when an LED lighting module is positioned at greater distances (e.g., greater than about 6 inches) from the surface(s) onto which light is projected. As a result, the techniques described herein are applicable to a wide range of mobile (e.g., aeronautical, automotive, etc.) and non-mobile (e.g., residential buildings, commercial buildings, outdoors, etc.) lighting applications in which light mixing is desired. Such techniques are described below in further detail in conjunction with FIGS. 2A-4.

Optical Devices for Light Mixing

Figure 2A:
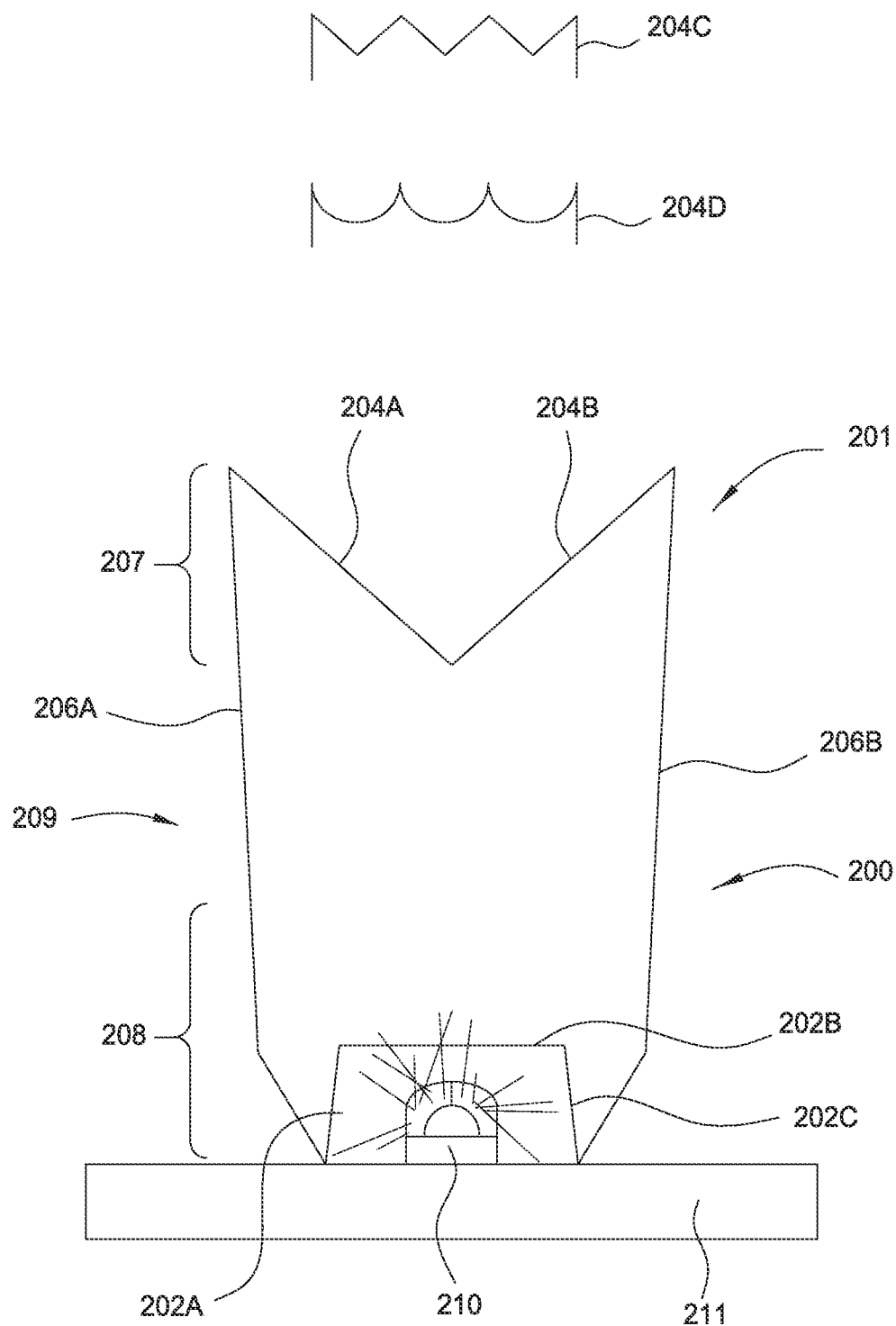
FIG. 2A illustrates a schematic cross-sectional view of an optical device and LED assembly in accordance with aspects of the disclosure.

FIG. 2A illustrates a schematic cross-sectional view of an optical device 200 and LED assembly 210 in accordance with aspects of the disclosure. As shown, the optical device 200 includes a body 201 having lower surfaces 202A, 202B, 202C (collectively "lower surface 202"), upper surfaces 204A, 204B (collectively "upper surface 204"), and lateral surfaces 206A, 206B. The LED assembly 210 is disposed proximate to the lower surface 202 of the optical device 200. In some aspects, the LED assembly 210 includes red, green, and/or blue (RGB) LEDs, the output of which is mixed to produce light that is substantially white in appearance. In other aspects, the LED assembly 210 may include other LED colors, such as yellow and/or ultraviolet (UV), and/or other optical components (e.g., phosphors) that enable light to be mixed to generate one or more wavelengths of light included in and/or outside of the visible spectrum. The body 201 of the optical device 200 may include a substantially transparent material, such as a transparent polymer (e.g., polycarbonate, acrylic, etc.), a glass, a crystalline material, and the like. The optical device 200 may be mounted to a substrate 211 and/or to the LED assembly 210 using any practical means, including an adhesive, an interlocking structure, and/or one or more fasteners (not shown in FIG. 2A). Additionally, the optical device 200 may be mounted in a reflector, as described below in further detail in conjunction with FIG. 3A.

In various aspects, the lower surface 202 of the optical device 200 is substantially transparent, and the upper surface 204 of the optical device 200 includes a specular layer, such as a reflective film or coating (e.g., silver, aluminum, an alloy, etc.) disposed on the upper surface 204. In such aspects, light (e.g., RGB light) emitted by the LED assembly 210 passes through the lower surface 202 and into the optical device 200. Once light has entered the optical device 200, the light reflects off of one or more interior surfaces of the optical device 200 prior to exiting the optical device 200. For example, light may reflect off of the upper surface 204 towards one or both of the lateral surfaces 206A, 206B. Light may also reflect off of the lateral surfaces 206A, 206B (e.g., via total internal reflection), further improving the degree of light mixing within the optical device 200. Accordingly, by disposing one or more specular layers on the upper surface 204 of the optical device 200 and, in some aspects, on one or more lateral surfaces 206A, 206B of the optical device 200, light may be reflected off of one or more interior surfaces prior to exiting the optical device 200. Reflecting light off of one or more interior surfaces increases the degree of light mixing, allowing more uniform light to be emitted from the optical device 200. Further, increasing the degree of light mixing prior to emitting the light from the optical device 200 allows the optical device 200 to be positioned in close proximity to the surface(s) onto which the light is to be projected while still maintaining sufficient light uniformity.

In some aspects, a portion of the light rays emitted by the LED assembly 210 may exit the optical device 200 before reflecting off of any surfaces within the optical device 200. However, in such aspects, the dimensions of the optical device 200 as well as the location(s) of specular layers on the surface 204 of the optical device 200 may be selected to reduce the amount of light that is transmitted through the optical device 200 without reflection, such that light is sufficiently mixed prior to (or shortly after) exiting the optical device 200. For example, in some aspects, in order to increase the number of reflections of light prior to the light exiting the optical device 200 (e.g., to increase the amount of light mixing), one or more specular layers may be disposed on lateral surface 206A and/or lateral surface 206B. For example, a specular layer (e.g., a reflective film) may be disposed on an upper portion 207 of lateral surface 206A and/or lateral surface 206B, such that light strikes the interior surface of the upper portion 207 of lateral surface 206A and/or lateral surface 206B and reflects back towards the interior of the optical device 200. In the same or other aspects, a specular layer may be disposed on a lower portion 208 of lateral surface 206A and/or lateral surface 206B. Further, any of the aspects described above may also include one or more specular layers disposed on the upper surface 204 of the optical device 200.

In aspects that include a specular layer disposed on both an upper portion 206 and a lower portion 208 of lateral surface 206A and/or lateral surface 206B, a substantially transparent region 209 may be disposed between the upper portion 206 and the lower portion 208. In such aspects, the specular layers disposed on the upper portion 206 and lower portion 208 may increase the number of reflections that occur prior to the light exiting the optical device 200, further improving light mixing efficiency. Additionally, by disposing a substantially transparent region 209 between the upper portion 206 and the lower portion 208, such aspects may enable light to be emitted from the optical device 200 in a more controlled manner. For example, light may be emitted through a smaller aperture defined by region 209 and/or may be emitted from the optical device 200 at shallower angles relative to the surface on which the LED assembly 210 is disposed.

Specular layers may be disposed on the optical device 200 using any practical technique(s). For example, in some aspects, specular layers are deposited on one or more surfaces of the optical device 200 via chemical or physical deposition techniques. In the same or other aspects, specular layers may be adhered to one or more surfaces of the optical device 200, such as via a lamination process.

In addition to, or instead of, the specular layers described above, one or more diffuse layers may be disposed on and/or within the optical device 200 to improve light mixing. For example, a diffuse layer may be disposed on the surface of the optical device 200 to cause diffuse light to be emitted at a plurality of different angles when exiting the optical device 200, further enhancing light mixing. In some aspects, a diffuse layer may be disposed adjacent to two specular layers (e.g., at or proximate to region 209), where one specular layer is disposed on the upper portion 206 of a lateral surface 206A, 206B and the other specular layer is disposed on the lower portion 208 of the lateral surface 206A, 206B. In other aspects, a diffuse layer is located above (or below) a specular layer that is disposed on the upper portion 206 or the lower portion 208 of a lateral surface 206A, 206B. In still other aspects, a specular layer is disposed on the upper surface 204 of the optical device 200, and a diffuse layer is disposed on a portion of, or the entire surface area of, one or both lateral surface(s) 206A, 206B.

The diffuse layer described above may be a rough surface region that causes light to be reflected and/or scattered in a plurality of different directions relative to a given surface of the optical device 200. For example, one or more surfaces of the optical device 200 may be treated to generate a diffuse surface, such as be physical abrasion, chemical etching, patterning, and the like. Additionally, the diffuse layers may be deposited or otherwise disposed on one or more surfaces of the optical device 200, such as via adhesion, chemical deposition, physical deposition, and the like. For example, the diffuse layers described above may include a series of optical elements (e.g., microlenses) that are adhered to, or formed on, one or more surfaces of the optical device 200 to alter the path of light passing through a given surface in order to promote light mixing. In the same or other aspects, other types of diffuse layers capable of enhancing light mixing may be used.

In some aspects, the upper surface 204 defines a concave surface of the optical device 200. In such implementations, the optical device 200 may include a concave polyhedron. For example, as shown in FIG. 2A, one or more faces (e.g., 204A and/or 204B) of the upper surface 204 may form acute angles with the lateral surface(s) 206A, 206B such that light rays reflect off of the upper surface 204 towards the sides of the optical device 200. Additionally, if a specular film is disposed on one or both of the lateral surfaces 206A, 206B, light may continue to reflect off of the lateral surface(s) 206A, 206B within the optical device 200. Accordingly, the path length of the light within the optical device 200 may be increased, increasing the degree to which light mixing occurs prior to light exiting the optical device 200.

Figure 2B:
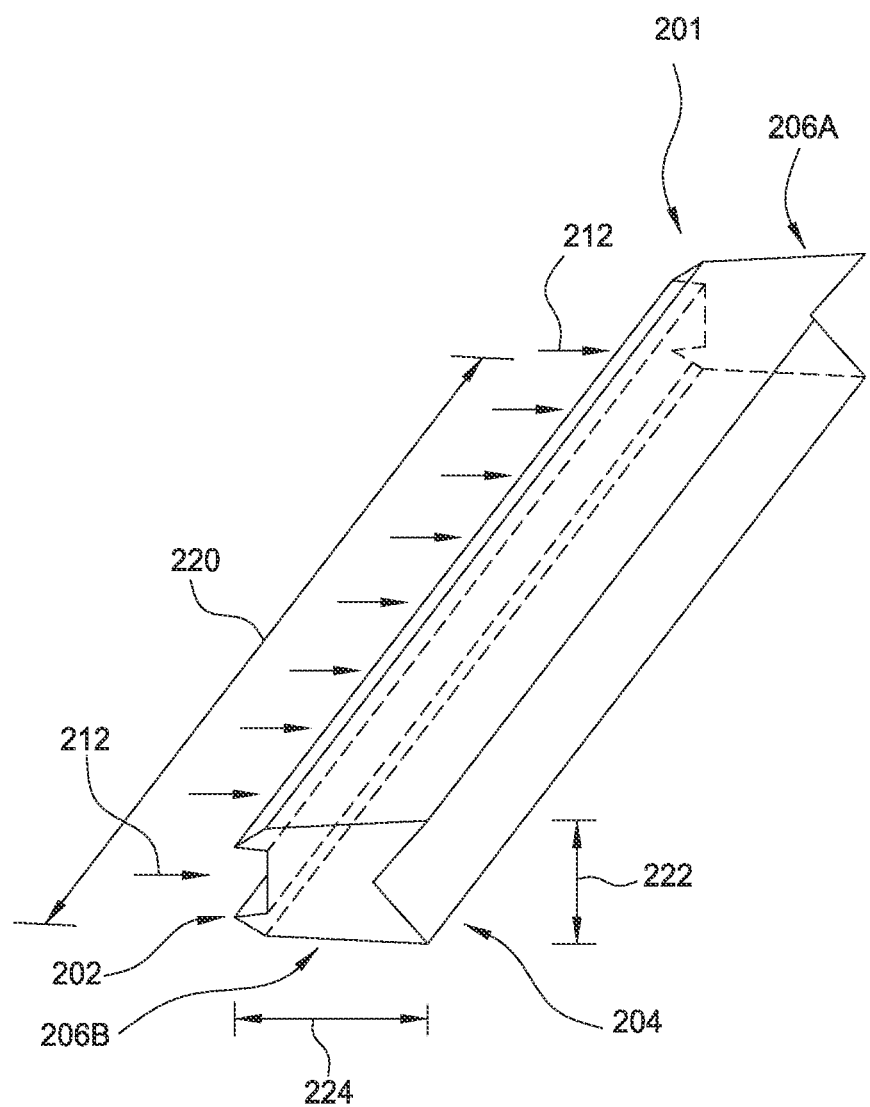
FIG. 2B illustrates a schematic perspective view of the optical device of FIG. 2A in accordance with aspects of the disclosure.

Although a single concave surface is shown in FIGS. 2A and 2B, in other aspects, multiple concave surfaces may be included on the upper surface 204 of the optical device 200. For example, multiple V-shaped surfaces 204C (e.g., a sawtooth pattern) may be included on the upper surface 204. Additionally, one or more elliptical concave surfaces 204D may be included on the upper surface 204 instead of, or in addition to, the planar concave surface shown in FIGS. 2A and 2B. In still other examples, a convex surface having any shape described above may be included on the upper surface 204.

The surface regions through which light is emitted from the optical device 200—including regions that are substantially transparent (e.g., region 209) and/or regions on which a diffuse layer is disposed—may be shaped according to the light emission characteristics needed for a particular lighting application. For example, the substantially transparent regions and/or diffuse layers through which light is emitted may be shaped (e.g., circular, elliptical, etc.) such that light is emitted in a certain direction and/or emitted from a certain surface area of the optical device 200. In some examples, one or more substantially transparent regions and/or diffuse layers having a circular, elliptical, etc. shape may be disposed on the optical device 200, and these regions/layers may be surrounded by one or more specular layers. Accordingly, light may be reflected and mixed within the optical device 200 until the light reaches, and is emitted through, a substantially transparent region or diffuse layer. Once the mixed light is emitted through a substantially transparent region or diffuse layer, the light may be directed (e.g., via a reflector) towards one or more surfaces (e.g., a ceiling structure or panel included in a passenger cabin 101 or automobile) that are intended to be illuminated by the optical device 200.

As shown in FIG. 2B, the optical device 200 may extend along a length 220 that is greater than the width 222 and/or height 224 of the optical device 200. In such aspects, a length 220 of approximately 1 to 60 inches, such as approximately 6 to 48 inches, may be used. In addition, a width 222 of approximately 0.1 to 2 inches and a height of approximately 0.5 to 4 inches, such as approximately 2 to 3 inches, may be used. In other aspects, greater or lesser lengths 220, widths 222, and/or heights 224 may be used, and/or the relative dimensions of the optical device 200 may be different. For example, in some aspects the height 224 and/or width 222 may be greater than the length 220. Additionally, the overall size of the optical device 200 may be increased or decreased, as appropriate, for a particular lighting application.

Although only a single LED assembly 210 is shown in FIG. 2A, any number of LED assemblies 210 may be disposed proximate to one or more surfaces of the optical device 200. For example, multiple LED assemblies 210 may be disposed adjacent to one another along the length 220 and/or width 222 of the optical device 200. For example, one or more LED assemblies 210 may be located at each location 212 along the length 220 of the optical device 200. In aspects in which multiple LED assemblies 210 are disposed along the length 220 of optical device 200, an LED assembly 210 may be disposed approximately every 0.5 to 6 inches, such as approximately every 1 to 3 inches, in order to ensure relatively uniform light distribution. In other aspects, the LED assemblies 210 may be spaced closer together or further apart, such as when light is desired at specific locations along the length 220 of the optical device 200.

Figure 3A:
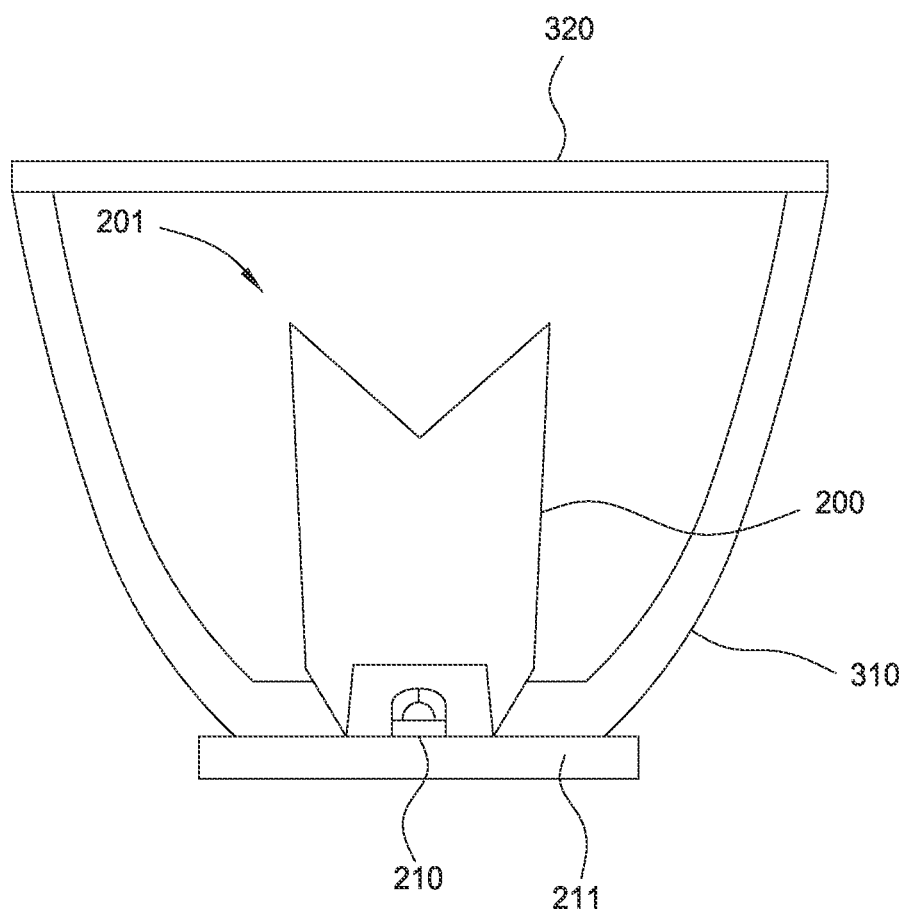
FIG. 3A illustrates a schematic cross-sectional view of the optical device of FIGS. 2A and 2B disposed proximate to a reflector in accordance with aspects of the disclosure.

FIG. 3A illustrates a schematic cross-sectional view of the optical device 200 of FIGS. 2A and 2B disposed proximate to a reflector 310 in accordance with aspects of the disclosure. As shown, the optical device 200 is disposed within a reflector 310 in order to control the direction of light rays emitted by the optical device 200. Additionally, a lens 320 may be disposed over the optical device and/or reflector 310. In some aspects, the lens 320 may include a focusing element, such as one or more convex lenses. For example, the lens 320 may include a converging or diverging lens that directs light in a certain direction. In other aspects, the lens 320 may include a plurality of smaller lens (e.g., microlenses) that direct emitted light in a plurality of directions. In the same or other aspects, the lens 320 may include one or more diffuse regions that enhance light mixing and/or soften the light that is emitted by the optical device 200.

Figure 3B:
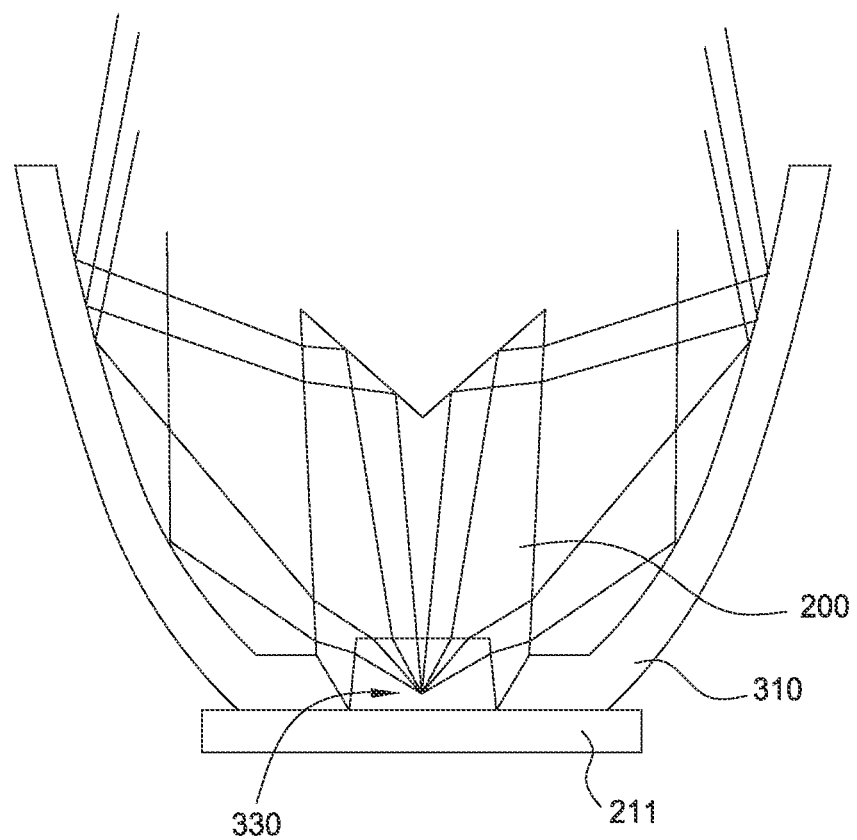
FIGS. 3B and 3C illustrate the paths of light rays that may be emitted by the optical device of FIGS. 2A and 2B in accordance with aspects of the disclosure.
Figure 3C:
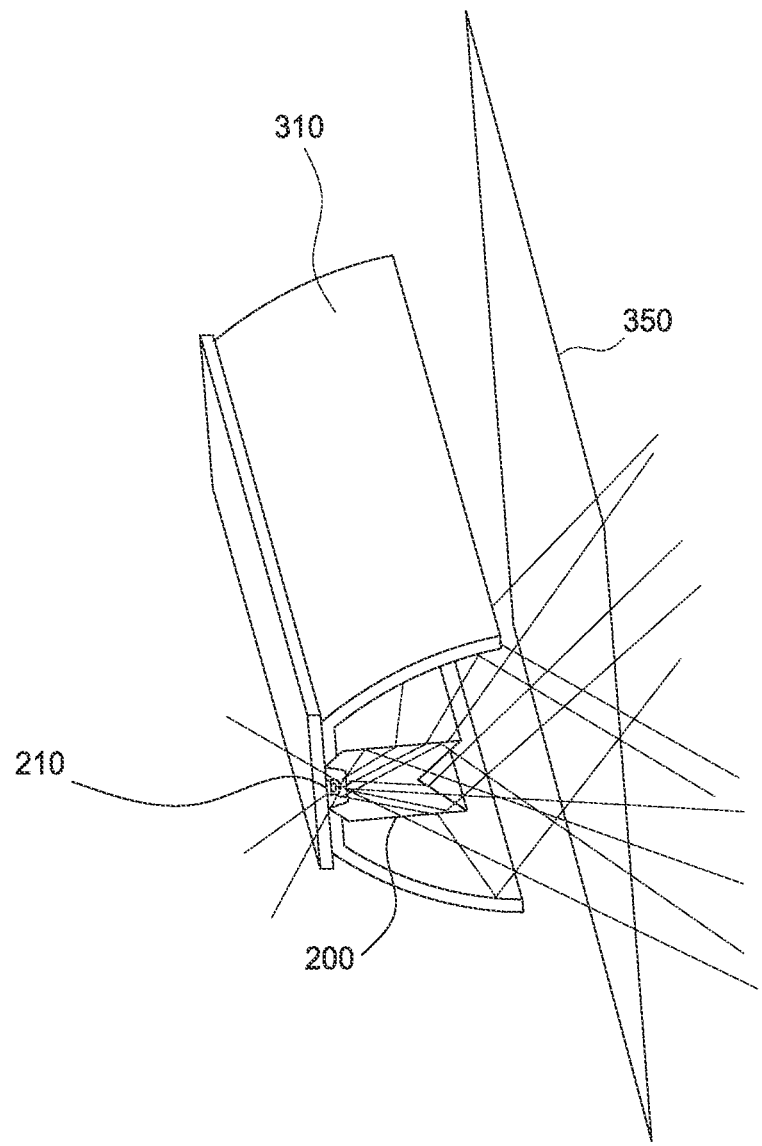

FIGS. 3B and 3C illustrate the paths of light rays that may be emitted by the optical device 200 of FIGS. 2A and 2B in accordance with aspects of the disclosure. As shown in FIG. 3B, some light rays emitted from a light source 330 (e.g., LED assembly 210) enter the optical device 200, reflect off of the upper surface 204 of the optical device 200, exit the optical device 200, and reflect off of the reflector towards a target location 350. Other light rays emitted from the light source 330 refract as they pass through the optical device 200 and then reflect off of the reflector towards the target location 350. Accordingly, the paths of the light rays may cross over one another, allowing the light to mix before and/or shortly after exiting the optical device 200 and reflector 310. Although not shown in FIG. 3B, additional reflections may occur—and, thus, additional light mixing may be achieved—when one or more specular layers are disposed on the lateral surfaces 206A, 206B of the optical device 200.

Figure 4:
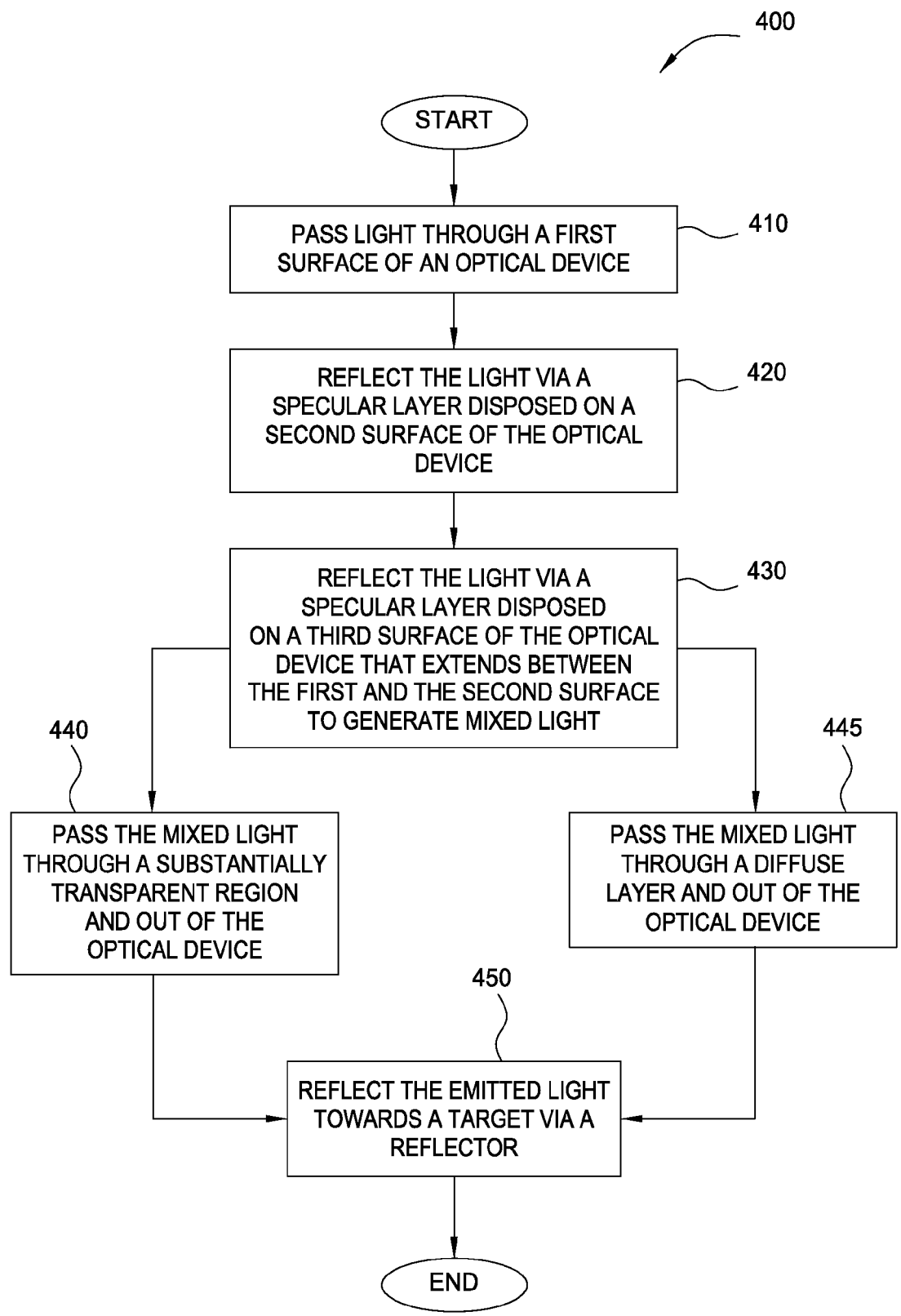
FIG. 4 is a flow chart of a method for mixing light in accordance with aspects of the disclosure.

FIG. 4 is a flow chart of a method 400 for mixing light in accordance with aspects of the disclosure. Although the method 400 is described in conjunction with FIGS. 2A-3C, persons skilled in the art will understand that any system configured to perform the method, in any appropriate order, falls within the scope of the present disclosure.

The method 400 begins at step 410, where a light source (e.g., LED assembly 210) passes light through a first surface (e.g., the lower surface 202) of the optical device 200. At step 420, a specular layer disposed on a second surface (e.g., the upper surface 204) of the optical device 200 reflects the light back towards an interior portion of the optical device 200. Then, at step 430, one or more specular layers disposed on one or more surfaces of the optical device 200 (e.g., lateral surface 206A and/or lateral surface 206B) reflect the light to generate mixed light.

Next, at step 440, the mixed light may be passed through a substantially transparent region (e.g., surface region 209) and out of the optical device 200. In addition to, or instead of, passing the light though a substantially transparent region and out of the optical device 200, at step 445, the light may be passed through a diffuse layer (e.g., located at or proximate to surface region 209) and out of the optical device 200. At step 450, the light emitted from the optical device 200 is reflected by an optional reflector 310 towards a target location 350. The method 400 then ends.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware aspect, an entirely software aspect (including firmware, resident software, micro-code, etc.) or an aspect combining software and hardware aspects that may all generally be referred to herein as a "circuit," "module" or "system."

The flowchart and block diagrams in the Figures illustrate the functionality and operation of possible implementations of systems and methods according to various aspects of the present invention. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the foregoing is directed to aspects of the present invention, other and further aspects of the invention may be devised without departing from the basic scope thereof, and the scope thereof is determined by the claims that follow.

What is claimed is:

1. An optical device for mixing light produced by a light source physically coupled with a substrate, the optical device comprising:
  a body member formed of a substantially transmissive material, the body member defining:
    a lower surface comprising a plurality of substantially transmissive lower surfaces, wherein the light source is disposed between the substrate and the lower surface;
    an upper surface disposed opposite the lower surface and having a first specular layer disposed thereon; and
    a first lateral surface extending between the lower surface and the upper surface, the first lateral surface defining:
      a first portion proximate to the lower surface and having a second specular layer disposed thereon, wherein the first portion is configured to reflect toward the upper surface part of light that is transmitted through the lower surface,
a second portion proximate to the upper surface and having a third specular layer disposed thereon, and
a third portion between the first portion and the second portion, wherein the second portion and third portion are co-planar in a first plane having a first angle relative to the substrate, and wherein at least part of the first portion is arranged at a second angle different than the first angle to reflect light toward the upper surface,
wherein mixed light exits the optical device by passing through the third portion of the first lateral surface,
wherein the mixed light comprises:
first light that passes without any reflection by the first portion, the second portion, and the upper surface,
second light that passes after being reflected by both the first portion and the second portion, and
third light that passes after being reflected by both the second portion and the upper surface.

2. The optical device of claim 1, wherein a diffuse layer is disposed on the third portion of the first lateral surface.

3. The optical device of claim 1, wherein the third portion of the first lateral surface is substantially transparent.

4. The optical device of claim 2, wherein the diffuse layer comprises a plurality of lenses.

5. The optical device of claim 1, wherein the upper surface comprises a first planar surface that forms an acute angle with the first portion of the first lateral surface.

6. The optical device of claim 1, wherein the upper surface defines a first concave surface of the optical device.

7. The optical device of claim 6, wherein the optical device comprises a concave polyhedron.

8. The optical device of claim 6, further comprising a second lateral surface extending between the lower surface and the upper surface,
wherein the upper surface comprises a first planar surface and a second planar surface, the first planar surface forms a first acute angle with the first lateral surface, and the second planar surface forms a second acute angle with the second lateral surface.

9. The optical device of claim 8, further comprising a third specular layer disposed on a fourth portion of the second lateral surface that is proximate to the lower surface, and a fourth specular layer disposed on a fifth portion of the second lateral surface that is proximate to the upper surface.

10. A lighting apparatus, comprising:
an optical device configured to mix light produced by a light source that is physically coupled with a substrate, the optical device comprising a body member of a substantially transmissive material, the body member defining:
a lower surface comprising a plurality of substantially transmissive lower surfaces, wherein the light source is disposed between the substrate and the lower surface;
an upper surface disposed opposite the lower surface and having a first specular layer disposed thereon; and
a first lateral surface extending between the lower surface and the upper surface, the first lateral surface defining:
a first portion proximate to the lower surface and having a second specular layer disposed thereon, wherein the first portion is configured to reflect toward the upper surface part of light that is transmitted through the lower surface,
a second portion proximate to the upper surface and having a third specular layer disposed thereon, and
a third portion between the first portion and the second portion and configured to pass mixed light, wherein the second portion and third portion are co-planar in a first plane having a first angle relative to the substrate, and wherein at least part of the first portion is arranged at a second angle different than the first angle to reflect light toward the upper surface,
wherein the mixed light comprises:
first light that passes without any reflection by the first portion, the second portion, and the upper surface,
second light that passes after being reflected by both the first portion and the second portion, and
third light that passes after being reflected by both the second portion and the upper surface; and
a reflector disposed proximate to the first lateral surface and configured to reflect the mixed light.

11. The lighting apparatus of claim 10, wherein a diffuse layer is disposed on the third portion of the first lateral surface.

12. The lighting apparatus of claim 10, wherein the third portion of the first lateral surface is substantially transparent.

13. The lighting apparatus of claim 10, wherein the upper surface defines a first concave surface of the optical device.

14. The lighting apparatus of claim 13, wherein the optical device comprises a concave polyhedron.

15. The lighting apparatus of claim 10, further comprising at least one lens disposed across an opening of the reflector, wherein the reflector is configured to reflect the mixed light through the opening.

16. A method of mixing light using an optical device, the light produced by a light source physically coupled with a substrate, the optical device comprising a body member formed of a substantially transmissive material, the method comprising:
passing light from the light source through a lower surface of the body member, the lower surface comprising a plurality of substantially transmissive lower surfaces, the light source disposed between the substrate and the lower surface, wherein a part of the passed light is directed toward a reflective upper surface of the body member that is disposed opposite the lower surface; and
passing mixed light through part of a first lateral surface of the body member, the first lateral surface extending between the lower surface and the upper surface, the first lateral surface defining (i) a reflective first portion proximate to the lower surface, (ii) a reflective second portion proximate to the upper surface, and (iii) a third portion between the first portion and the second portion, wherein the second portion and third portion are co-planar in a first plane having a first angle relative to the substrate, and wherein at least part of the first portion is arranged at a second angle different than the first angle to reflect light toward the upper surface,
wherein the mixed light passes through the third portion and comprises:
first light that passes without any reflection by the first portion, the second portion, and the upper surface,
second light that passes after being reflected by both the first portion and the second portion, and
third light that passes after being reflected by both the second portion and the upper surface.

17. The method of claim 16, wherein passing the mixed light through the third portion comprises passing the mixed light through a diffuse layer disposed on the third portion to generate diffuse light, the method further comprising:
 reflecting, via a reflector disposed proximate to the optical device, the diffuse light towards a target.

18. The method of claim 16, wherein the optical device further comprises a second lateral surface extending between the lower surface and the upper surface, and wherein the mixed light further comprises:
 fourth light that passes after being reflected by a reflective portion of the second lateral surface.

19. The optical device of claim 1, wherein the plurality of substantially transmissive lower surfaces comprises:
 a first lower surface that is substantially parallel with a substrate surface; and
 second and third lower surfaces each arranged between the first lower surface and the substrate surface,
 wherein the second lower surface forms an acute angle with the first lateral surface,
 wherein the third lower surface forms an acute angle with a second lateral surface disposed opposite the first lateral surface, a third specular layer disposed on a fourth portion of the second lateral surface proximate to the lower surface, and
 wherein the third specular layer is configured to reflect a second part of the light that is transmitted through the lower surface toward the upper surface.

\* \* \* \* \*